US012612512B2

(12) United States Patent (10) Patent No.: US 12,612,512 B2
Hara et al. (45) Date of Patent: Apr. 28, 2026

(54) CELLULOSE FIBER-DISPERSING RESIN COMPOSITE MATERIAL, FORMED BODY, AND COMPOSITE MEMBER

(71) Applicant: FURUKAWA ELECTRIC CO., LTD., Tokyo (JP)

(72) Inventors: Hidekazu Hara, Tokyo (JP); Jirou Hiroishi, Tokyo (JP); Jae Kyung Kim, Tokyo (JP); Masami Tazuke, Tokyo (JP); Toshihiro Suzuki, Tokyo (JP); Masato Ikeuchi, Tokyo (JP); Jiro Sakato, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 695 days.

(21) Appl. No.: 17/226,581

(22) Filed: Apr. 9, 2021

(65) Prior Publication Data

US 2021/0221988 A1 Jul. 22, 2021

Related U.S. Application Data

(63) Continuation of application No. PCT/JP2019/047436, filed on Dec. 4, 2019.

(30) Foreign Application Priority Data

Dec. 5, 2018 (JP) ................................. 2018-228578

(51) Int. Cl.
*C08L 23/06* (2006.01)
*B32B 15/08* (2006.01)

(52) U.S. Cl.
CPC .............. *C08L 23/06* (2013.01); *B32B 15/08* (2013.01); *B32B 2250/02* (2013.01);
(Continued)

(58) Field of Classification Search
CPC ......... B32B 15/00; B32B 15/08; B32B 15/20; B32B 2262/00
See application file for complete search history.

(56) References Cited

U.S. PATENT DOCUMENTS 5,679,456 A * 10/1997 Sakai .................... B29C 48/362
428/350
2012/0178856 A1* 7/2012 Gobl ........................ D01G 1/04
428/401
(Continued)

FOREIGN PATENT DOCUMENTS

CN 102971462 A 3/2013
CN 103510421 A 1/2014
(Continued)

OTHER PUBLICATIONS

Xia, C. et al., "Natural fiber and aluminum sheet hybrid composites for high electromagnetic interference shielding performance", 2017, Composites Part B: Engineering, 114 , pp. 121-127. (Year: 2017).*
(Continued)

*Primary Examiner* — Peter Y Choi
(74) *Attorney, Agent, or Firm* — Birch, Stewart, Kolasch & Birch, LLP

(57) ABSTRACT

A cellulose fiber-dispersing resin composite material, containing a cellulose fiber dispersed in a resin, in which a content of the cellulose fiber is 1% by mass or more and less than 70% by mass, and LL and LN satisfy the following [Expression 1], when a length weighted average fiber length of the cellulose fiber is taken as LL, and a number average fiber length of the cellulose fiber is taken as LN measured under the following measurement condition;
a formed body using this composite material; and
a composite member using this formed body.
<Measurement Condition>
(Continued)

LL and LN are determined for a dissolution residue obtained by immersing the cellulose fiber-dispersing resin composite material in a solvent capable of dissolving the resin in the composite material, in accordance with Pulps-Determination of fiber length by automated optical analysis specified by ISO 16065 2001.

$$1.1 < (LL/LN) < 1.5 \qquad \text{[Expression 1]}$$

14 Claims, 1 Drawing Sheet

(52) U.S. Cl.
　　CPC ... *B32B 2260/021* (2013.01); *B32B 2260/046* (2013.01); *B32B 2262/04* (2013.01); *C08L 2205/03* (2013.01); *C08L 2205/16* (2013.01)

(56) References Cited

U.S. PATENT DOCUMENTS

| | | | |
|---|---|---|---|
| 2013/0309493 A1 | 11/2013 | Suzuki et al. | |
| 2014/0004326 A1 | 1/2014 | Petersen et al. | |
| 2014/0352903 A1 | 12/2014 | Ernegg | |
| 2020/0010654 A1 | 1/2020 | Kim et al. | |

FOREIGN PATENT DOCUMENTS

| | | | |
|---|---|---|---|
| EP | 0 040 848 A1 | 12/1981 | |
| EP | 0 747 419 A2 | 12/1996 | |
| EP | 3 441 425 A1 | 2/2019 | |
| JP | 3007880 B1 | 2/2000 | |
| JP | 2007-45863 A | 2/2007 | |
| JP | 2007-260941 A | 10/2007 | |
| JP | 2012222073 A | 11/2012 | |
| JP | 2012-236906 A | 12/2012 | |
| JP | 2013-540913 A | 11/2013 | |
| JP | 2017-155248 A | 9/2017 | |
| WO | WO 2012/007363 A1 | 1/2012 | |
| WO | WO 2012/070616 A1 | 5/2012 | |
| WO | WO 2016/042930 A1 | 3/2016 | |
| WO | WO 2018/099977 A1 | 6/2018 | |
| WO | WO 2018/105174 A1 | 6/2018 | |
| WO | WO 2018/180469 A1 | 10/2018 | |

OTHER PUBLICATIONS

Japanese Office Action for corresponding Japanese Application No. 2020-559969, dated Apr. 4, 2023, with English translation.

"Polypropylene/natural fibres composites: Analysis of fibre dimensions after compounding and observations of fibre rupture by rheo-optics", Anne Le Duc et al., Composites Part A, Elsevier, Amsterdam, NL, vol. 42, No. 11, Jul. 27, 2011, pp. 1727-1737.

"Rheological behavior of short sisal fiber-reinforced polystyrene composites", Nair et al., Composites Part A, Elsevier, Amsterdam, NL, vol. 31, No. 11, Nov. 1, 2000, pp. 1231-1240.

Supplementary European Search Report issued in corresponding European Application No. 19 89 2904 on Jul. 21, 2022.

International Search Report for PCT/JP2019/047436 mailed on Feb. 10, 2020.

"Advances in Research and Process Investigation on Surface Modification of Cellulose Fibers", Mar. 2009, pp. 1-6.

First Notification of Office Action issued in corresponding Chinese Application No. 201980062254.7 on Mar. 18, 2022.

* cited by examiner

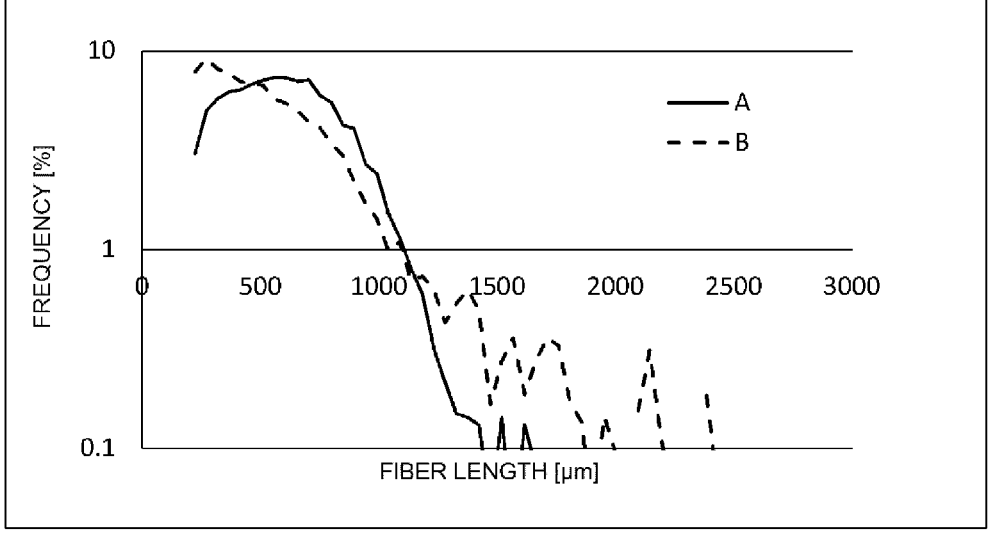

CELLULOSE FIBER-DISPERSING RESIN COMPOSITE MATERIAL, FORMED BODY, AND COMPOSITE MEMBER

CROSS-REFERENCE TO RELATED APPLICATIONS

This application is a Continuation of PCT International Application No. PCT/JP2019/047436 filed on Dec. 4, 2019, which claims priority under 35 U.S.C. § 119 (a) to Japanese Patent Application No. 2018-228578 filed in Japan on Dec. 5, 2018. Each of the above applications is hereby expressly incorporated by reference, in its entirely, into the present application.

TECHNICAL FIELD

The present invention relates to a cellulose fiber-dispersing resin composite material, a formed body, and a composite member.

BACKGROUND ART

In order to improve mechanical properties of resin products, fiber-reinforced resins formed by blending reinforcing fibers such as glass fiber, carbon fiber, and cellulose fiber in a resin have been known.

When glass fiber is used as the reinforcing fiber, the glass fiber, which is an incombustible inorganic substance, remains in a large amount as ash even when being burnt by thermal recycling or the like, and thus has a problem in energy recovery rate in recycling. Further, the specific gravity of the glass fiber is larger than that of resin, and thus there is also a problem that the weight of the fiber-reinforced resin increases. Moreover, the glass fiber has a larger heat capacity than that of the resin, and thus requires time for cooling and solidifying after being formed, which restricts improvement in the production efficiency of a resin product.

Meanwhile, using carbon fiber as the reinforcing fiber in place of the glass fiber can solve the above problems. However, the carbon fiber is expensive, and thus there is a problem that use of the carbon fiber as the reinforcing fiber increases the cost of resin products.

On the other hand, a cellulose fiber, which is light weight and leaves less combustion residues in thermal recycling or the like, and is also relatively inexpensive, is advantageous in reduction in weight, recycling property, cost and the like. Techniques related to fiber-reinforced resins using a cellulose fiber have been reported. For example, Patent Literature 1 describes that a composite material is obtained by kneading a composite material in which wax is adhered to dried waste pulp fiber subjected to defibration treatment, with a matrix resin, and the length weighted average fiber length of the defibrated waste pulp fiber is 0.1 to 5.0 mm.

Further, Patent Literature 2 discloses a paper-containing resin composition containing pulverized products of paper containing 50% by mass or more of conifer bleached chemical pulp and a resin, and having a melt mass flow rate of 2.0 to 7.0 g/10 min. Patent Literature 2 describes that the average fiber length of the pulp is 0.3 to 2 mm.

Further, Patent Literature 3 describes that pellets are obtained by mixing a specific amount of thermoplastic resin pellets in waste paper pellets obtained by mixing pulverized waste paper and a polyolefin elastomer, kneading them with heating, and granulating the resulting material, and the waste paper is pulverized to an average thickness of 0.01 to 0.1 mm and an average length of 0.1 to 2.5 mm.

Further, Patent Literature 4 discloses a resin composition containing a thermoplastic resin, a cellulose fiber, a water-soluble resin, and a modified olefin resin in specific amounts, and describes use of a cellulose fiber having an aspect ratio of 5 or more.

Further, Patent Literature 5 describes that paper pellets obtained by impregnating pellets of pulverized products of film laminated paper with water, and a polypropylene resin and a maleic anhydride-modified polypropylene resin are mixed, and the materials are fed to a twin screw extruder, followed by kneading, to obtain pellets formed from a paper-blended thermoplastic resin composition, and these pellets are injection-molded.

Further, Patent Literature 6 describes that the area of a cellulose aggregate could be minimized by kneading a polyolefin resin, a powder cellulose, and water by a twin screw extruder.

CITATION LIST

Patent Literatures

Patent Literature 1: WO 2012/070616
Patent Literature 2: JP-A-2007-45863 ("JP-A" means unexamined published Japanese patent application)
Patent Literature 3: Japanese Patent No. 3007880
Patent Literature 4: JP-A-2012-236906
Patent Literature 5: JP-A-2007-260941
Patent Literature 6: WO 2018/180469

SUMMARY OF INVENTION

Technical Problem

In the cellulose fiber-reinforced resin, the affinity at the interface between hydrophobic resin and hydrophilic cellulose fiber is insufficient, and therefore reinforcing effect provided by the cellulose fiber cannot be sufficiently obtained in some cases. To solve this problem, it has been known to improve the affinity between the resin and the cellulose fiber by blending an acid-modified resin or the like.

On the other hand, as for the characteristics of the cellulose fiber which affects the reinforcing effect of the resin, the size or shape of the cellulose fiber to be used has been studied as described in Patent Literatures 1 to 4. Further, as described in Patent Literatures 5 and 6, the dispersion state of the cellulose fiber and aggregates of cellulose resulting from kneading by a twin screw extruder with addition of water have been studied.

However, the above patent literatures merely refer to the size or shape of the cellulose fiber in a state before being mixed with the resin, or refer to the dispersion state of the cellulose fiber or cellulose aggregates, but do not accurately grasp the size or shape, and further, the distribution state of the fiber length of the cellulose fiber after being kneaded and dispersed in the resin.

The present invention provides a composite material formed by dispersing a cellulose fiber in a resin and having excellent mechanical properties such as tensile strength and flexural strength, a formed body using this composite material, and a composite member using this formed body.

Solution to Problem

The present inventors conducted studies on the relationship between improvement in the mechanical properties of a resin composite material formed by dispersing a cellulose fiber and the fiber length of the cellulose fiber. Specifically, the present inventors conducted studies based on an assumption that there is a difference in the fiber length distribution between a cellulose fiber before being mixed with the resin and a cellulose fiber in a state of being mixed and knead with the resin, and also, this fiber length distribution varies depending on the kneading condition, and thus the state of the fiber length distribution after kneading affects the mechanical properties of the composite material to be obtained.

That is, the present inventors immersed a composite material obtained by kneading a resin and a cellulose fiber in a solvent capable of dissolving the resin to dissolve the resin, then took out the cellulose fiber, and analyzed the cellulose fiber for the fiber length distribution in detail. As a result, the present inventors found that the fiber length distribution differs between before kneading and after kneading, and the mechanical properties of the obtained composite material can be improved by adjusting the fiber length distribution of the cellulose fiber in the composite material to a specific distribution state.

The present inventors continued to conduct further examination based on these findings, and have completed the present invention.

The above problems of the present invention have been solved by the following means.

[1]

A cellulose fiber-dispersing resin composite material, containing a cellulose fiber dispersed in a resin, wherein a content of the cellulose fiber is 1% by mass or more and less than 70% by mass, and wherein LL and LN satisfy the following [Expression 1], when a length weighted average fiber length of the cellulose fiber is taken as LL, and a number average fiber length of the cellulose fiber is taken as LN, measured under the following measurement condition.

<Measurement Condition>

LL and LN are determined for a dissolution residue obtained by immersing the cellulose fiber-dispersing resin composite material in a solvent capable of dissolving the resin in the composite material, in accordance with Pulps-Determination of fiber length by automated optical analysis specified by ISO 16065 2001.

$$1.1 < (LL/LN) < 1.5 \qquad \text{[Expression 1]}$$

[2]

The cellulose fiber-dispersing resin composite material described in the above item [1], wherein the LL and the LN satisfy the following [Expression 1-2].

$$1.1 < (LL/LN) < 1.4 \qquad \text{[Expression 1-2]}$$

[3]

The cellulose fiber-dispersing resin composite material described in the above item [1] or [2], wherein LW and the LN satisfy the following [Expression 2], when a weight weighted average fiber length of the cellulose fiber measured under the following measurement condition is taken as LW.

<Measurement Condition>

LW is determined for a dissolution residue obtained by immersing the cellulose fiber-dispersing resin composite material in a solvent capable of dissolving the resin in the composite material, in accordance with Pulps-Determination of fiber length by automated optical analysis specified by ISO 16065 2001.

$$1.1 < (LW/LN) < 3.0 \qquad \text{[Expression 2]}$$

[4]

The cellulose fiber-dispersing resin composite material described in any one of the above items [1] to [3], wherein the length weighted average fiber length of the cellulose fiber is 0.3 mm or more.

[5]

The cellulose fiber-dispersing resin composite material described in any one of the above items [1] to [4], wherein the content of the cellulose fiber in the cellulose fiber-dispersing resin composite material is determined by the following measurement method, and wherein the content of the cellulose fiber in the cellulose fiber-dispersing resin composite material is 5% by mass or more and less than 50% by mass.

<Measurement Method>

A sample of the cellulose fiber-dispersing resin composite material is subjected to a thermogravimetric analysis (TGA) under a nitrogen atmosphere at a heating rate of +10° C./min, and the content of the cellulose fiber is calculated from the following [Formula I].

$$(\text{content of cellulose fiber[\% by mass]}) = (\text{amount of mass reduction of sample at 200 to 380° C. [mg]}) \times 100/(\text{mass of sample before thermogravimetric analysis[mg]}) \qquad \text{[Formula I]}$$

[6]

The cellulose fiber-dispersing resin composite material described in any one of the above items [1] to [5], wherein the resin contains one type or two or more types of polyolefin resin, acrylonitrile-butadiene-styrene copolymer resin, acrylonitrile-styrene copolymer resin, polyamide resin, polyvinyl chloride resin, polyethylene terephthalate resin, polybutylene terephthalate resin, polystyrene resin, 3-hydroxybutyrate-co-3-hydroxyhexanoate polymer resin, polybutylene succinate resin, and polylactic acid resin.

[7]

The cellulose fiber-dispersing resin composite material described in any one of the above items [1] to [6], wherein the resin contains a polyolefin resin, and wherein in the measurement condition of the LL, the LN, and the LW, the dissolution residue obtained by immersing the resin in the composite material in the solvent capable of dissolving the resin is a hot xylene dissolution residue.

[8]

The cellulose fiber-dispersing resin composite material described in any one of the above items [1] to [7], containing aluminum dispersed in the resin.

[9]

The cellulose fiber-dispersing resin composite material described in the above item [8], wherein at least a part of the aluminum has a bent structure.

[10]

The cellulose fiber-dispersing resin composite material described in the above item [8] or [9], wherein when the cellulose fiber-dispersing resin composite material is thermally fused to an aluminum foil, the cellulose fiber-dispersing resin composite material exhibits a peel strength of 1.0 N/10 mm or more between the aluminum foil.

[11]

The cellulose fiber-dispersing resin composite material described in any one of the above items [1] to [10], containing at least one type of compound of a metal salt of organic acid, organic acid, and silicone.

[12]

The cellulose fiber-dispersing resin composite material described in any one of the above items [1] to [11], containing resin particles made of a resin different from the resin dispersed in the resin.

[13]

The cellulose fiber-dispersing resin composite material described in any one of the above items [1] to [12], wherein at least a part of the resin and/or at least a part of the cellulose fiber is derived from a recycled material.

[14]

A formed body, which is obtained by using the cellulose fiber-dispersing resin composite material described in any one of the above items [1] to [13].

[15]

The formed body described in the above item [14], which is a tubular body or is a divided body formed by dividing a tubular body.

[16]

A composite member, which is obtained by combining the formed body described in the above item [14] or [15], and another material.

[17]

The cellulose fiber-dispersing resin composite material described in any one of the above items [1] to [13], which is joined to a metal to form a composite.

In the present invention, the numerical range expressed by using the expression "to" means a range including numerical values before and after the expression "to" as the lower limit and the upper limit.

Advantageous Effects of Invention

The cellulose fiber-dispersing resin composite material, the formed body, and the composite member of the present invention are formed by dispersing a cellulose fiber in a resin, and are excellent in mechanical properties such as tensile strength and flexural strength.

BRIEF DESCRIPTION OF THE DRAWINGS

FIG. 1 is a graph showing the fiber length distribution of the cellulose fiber contained in the composite material in an embodiment of the composite material of the present invention.

DESCRIPTION OF EMBODIMENTS

Preferable embodiments of the present invention will be described.

[Cellulose Fiber-Dispersing Resin Composite Material]

In the cellulose fiber-dispersing resin composite material of the present invention (hereinafter, simply referred to as "composite material of the present invention"), a cellulose fiber is dispersed in a resin, and the content of the cellulose fiber in the composite material of the present invention (100% by mass) is 1% by mass or more and less than 70% by mass. A composite material in which the cellulose fiber is uniformly dispersed can be easily obtained and the mechanical properties thereof can be effectively increased by adjusting the content of the cellulose fiber to a level within this range. The composite material of the present invention can be in the form of containing inorganic substances such as aluminum, various types of additives and the like according to the type of raw material to be used.

The content of the cellulose fiber contained in the composite material of the present invention (% by mass) is determined by employing a value obtained by a thermogravimetric analysis as follows.

<Method of Determining Content of Cellulose Fiber (Cellulose Effective Mass Ratio)>

A composite material sample (10 mg) which has been dried in advance under the atmosphere at 80° C. for 1 hour is subjected to a thermogravimetric analysis (TGA) from 23° C. to 400° C. under a nitrogen atmosphere at a heating rate of +10° C./min. Then, the content of cellulose fiber (% by mass, also referred to as cellulose effective mass ratio) is calculated by the following [Formula I].

$$\text{(content of cellulose fiber[\% by mass])=(amount of mass reduction of composite material sample at 200 to 380° C.[mg])} \times 100 / \text{(mass of composite material sample in dried state before thermogravimetric analysis[mg])} \qquad \text{[Formula I]}$$

Incidentally, when the temperature is raised to 200 to 380° C. under a nitrogen atmosphere at a heating rate of +10° C./min, almost all of the cellulose fiber is thermally decomposed and lost. In the present invention, the % by mass calculated by the above [Formula I] is taken as the content of the cellulose fiber contained in the composite material. Incidentally, a part of the cellulose fiber is not lost and remains within this temperature range (in some cases), but when the temperature exceeds this temperature range, the cellulose fiber content cannot be distinguished from thermolysis loss or remaining components in a case where resin components are lost or compounds degradable at high temperatures are present together, for example, and as a result, it becomes difficult to measure the cellulose fiber amount. For this reason, the % by mass calculated by the [Formula I] is used for determining the cellulose fiber amount in the present invention. The cellulose fiber amount thus determined and the mechanical properties of the composite material are highly related.

In the composite material of the present invention, LL and LN satisfy the following [Expression 1], when the length weighted average fiber length of the cellulose fiber is taken as LL, and the number average fiber length is taken as LN measured under the following measurement condition.

$$1.1 < (LL/LN) < 1.5 \qquad \text{[Expression 1]}$$

The above LL and LN are determined for a dissolution residue (insoluble component) obtained by immersing the cellulose fiber-dispersing resin composite material in a solvent capable of dissolving the resin in the composite material, in accordance with Pulps-Determination of fiber length by automated optical analysis specified by ISO 16065 2001 (JIS P8226 2006).

More specifically, the above LL and LN are introduced by the following formulas. LL is the average fiber length weighted by the length of the fiber.

$$LL = (\Sigma n_i l_i^2)/(\Sigma n_i l_i)$$

$$LN = (\Sigma n_i l_i)/(\Sigma n_i)$$

Here, $n_i$ is the number of fibers in the i-th length range, and $l_i$ is the central value in the i-th length range.

LL/LN is an indicator expressing the spread of the fiber length distribution. A larger LL/LN indicates a wider spread of the fiber length distribution, whereas a smaller LL/LN indicates a narrower fiber length distribution.

In the composite material of the present invention, the mechanical strength of the composite material can be sufficiently improved by satisfying 1.1<(LL/LN)<1.5. When the LL/LN is too large, the fiber length distribution is too wide, and the proportion of fibers having a length shorter than the average fiber length increases. Meanwhile, when the LL/LN is too small, the fiber length distribution is too narrow, and the proportion of long fibers relatively decreases. Both cases tend to disadvantageously act in improvement of the mechanical strength. The composite material of the present invention is configured such that the relationship between the LL and LN satisfies the above [Expression 1].

When the LL/LN is too small, the fiber length distribution is too narrow, and the proportion of the long fibers relatively decreases, and as a result, mechanical strength such as tensile strength is hard to sufficiently increase. The (LL/LN) is preferably more than 1.15 from this point of view. That is, it is preferable to satisfy 1.15<(LL/LN)<1.5.

When the LL/LN is too large, the fiber length distribution is too wide, and the proportion of fibers having a longer length than the average fiber length increases, and at the same time, the proportion of short fibers increases. As a result, unevenness in mechanical strength such as tensile strength tends to occur, and mechanical strength such as tensile strength is hard to sufficiently increase. The (LL/LN) is preferably smaller than 1.4 from this point of view. That is, it is preferable to satisfy 1.1<(LL/LN)<1.4.

Incidentally, the solvent capable of dissolving the resin in the composite material can be appropriately selected according to the type of resin in the composite material. For example, when the resin is a polyolefin, a hot xylene and the like are given as an example, but the solvent is not limited thereto as long as it can dissolve the resin in the composite material but does not dissolve the cellulose fiber.

In the composite material of the present invention, the LL and LN preferably satisfy the following [Expression 1-2], and the LL and LN preferably satisfy the following [Expression 1-2b], more preferably satisfy the following [Expression 1-3], and even more preferably satisfy the following [Expression 1-4].

$$1.1<(LL/LN)<1.4 \qquad \text{[Expression 1-2]}$$

$$1.15<(LL/LN)<1.5 \qquad \text{[Expression 1-2b]}$$

$$1.15<(LL/LN)<1.4 \qquad \text{[Expression 1-3]}$$

$$1.2<(LL/LN)<1.3 \qquad \text{[Expression 1-4]}$$

The fiber length of the cellulose fiber in the composite material and the like can be measured to some extent by observing the surface of the composite material or a thin film obtained, for example, by slicing or pressing the composite material. However, with such a measurement method of observing from the two-dimensional observation surface, it is not possible to accurately measure all the fiber lengths of individual fibers dispersed in the resin because the observation surface is limited to a specific surface. The reason for this is that cellulose fibers in the composite material include at least fibers present overlapping in the thickness direction of the thin film, or fibers arranged inclined with respect to the observation surface. It can be considered to measure the fiber length by analysis of a transmission tomographic image such as X-ray, CT, and the like. However, the contrast of the cellulose fiber in the composite material is not necessarily clear actually, and accurate measurement of the fiber length is difficult accordingly. The present inventors accurately measured the fiber length distribution of the cellulose fiber in the composite material, found the technical relationship between the measured value and the mechanical properties of the composite material which has not been conventionally known, and thus completed the present invention based on such findings.

In the composite material of the present invention, when the weight weighted (length length weighted) average fiber length of the cellulose fiber is taken as LW, LW and the LN satisfy the following [Expression 2].

$$1.1<(LW/LN)<3.0 \qquad \text{[Expression 2]}$$

Similarly to the LL and LN, the above LW is determined for a dissolution residue (insoluble component) obtained by immersing the cellulose fiber-dispersing resin composite material in a solvent capable of dissolving the resin in the composite material, in accordance with Pulps-Determination of fiber length by automated optical analysis specified by ISO 16065 2001 (JIS P8226 2006).

More specifically, the above LW is introduced by the following formula. LW is the average fiber length weighted by the square of the length of the fiber.

$$LW=(\Sigma n_i l_i^3)/(\Sigma n_i l_i^2)$$

Here, $n_i$ is the number of fibers in the i-th length range, and $l_i$ is the central value in the i-th length range.

LW/LN is an indicator expressing the spread of the fiber length distribution. A larger LW/LN indicates a wider spread of the fiber length distribution, whereas a smaller LW/LN indicates a narrower fiber length distribution. When the LW/LN is too large, unevenness in the mechanical characteristics tend to increase. As can be seen from the definition of the LW/LN, the LW/LN drastically increases compared to the LL/LN when there are a large number of fibers having a longer fiber length. Therefore, the LW/LN serves as an indicator expressing the degree of the distribution of the side of fibers having a longer fiber length.

In the composite material of the present invention, the mechanical strength of the composite material can be further improved by satisfying 1.1<(LW/LN)<3.0. In the composite material of the present invention, from the viewpoint of further improving the mechanical strength, the relationship between the LW and LN more preferably satisfies the following [Expression 2-2], and even more preferably the following Expression [2-3].

$$1.5<(LW/LN)<2.3 \qquad \text{[Expression 2-2]}$$

$$1.5<(LW/LN)<2.1 \qquad \text{[Expression 2-3]}$$

In the composite material of the present invention, the relationship between the above LL and LN preferably satisfies the following [Expression 3]. Here, the units of the LL and LN in [Expression 3] are μm.

$$(LL/LN)<(LL\times0.0005+1.05) \qquad \text{[Expression 3]}$$

The mechanical strength of the composite material can be further improved by satisfying the above [Expression 3]. From this point of view, in the composite material of the present invention, the relationship between the above LL and LN more preferably satisfies the following [Expression 3-2], even more preferably satisfy [Expression 3-3], and even more preferably satisfy [Expression 3-4]. The tensile strength and flexural strength as well as flexural modulus can be improved by satisfying all the expressions of the above [Expression 3] to [Expression 3-4]. Here, the units of the LL and LN in [Expression 3-2], [Expression 3-3], and [Expression 3-4] are μm.

$$(LL/LN)<(LL\times0.0005+1.00) \qquad \text{[Expression 3-2]}$$

$$(LL/LN)<(LL\times0.0005+0.95) \qquad \text{[Expression 3-3]}$$

$$(LL\times0.0005+0.85)<(LL/LN) \qquad \text{[Expression 3-4]}$$

Incidentally, when the resin constituting the composite material contains a polyolefin resin, hot xylene (130 to 150°

C.) can be used as the solvent capable of dissolving the resin in the composite material in the measurement condition of the above LL, LN, and LW.

In the composite material of the present invention, the content of the cellulose fiber in the composite material (100% by mass) is 1% by mass or more and less than 70% by mass. From the viewpoint of improving mechanical characteristics, the content of the cellulose fiber in the composite material is more preferably 3% by mass or more, even more preferably 5% by mass or more, and even more preferably 10% by mass or more. Also, in consideration of further improving the flexural strength, the content of the cellulose fiber in the composite material is preferably 25% by mass or more.

In the composite material of the present invention, the content of the cellulose fiber in the composite material is preferably less than 50% by mass, and also preferably less than 40% by mass from the viewpoint of further suppressing water absorbing properties.

In the composite material of the present invention, the content of the cellulose fiber is preferably 5% by mass or more and less than 50% by mass, and also preferably 15% by mass or more and less than 40% by mass.

The composite material of the present invention is suitable as a material constituting a formed article (resin product) which is required to have mechanical strength in a predetermined level or more. In the composite material of the present invention, the cellulose fiber in the composite material satisfies the above relationship of the above [Formula I], and thus is excellent in mechanical strength. The reason for this is not clear, but it is presumed that, for example, reinforcing effects provided by the cellulose fiber against moderate deformation and rapid deformation depend on the specific length of the cellulose fiber, and therefore improvement in the mechanical strength is achieved by adjusting the fiber length distribution of the cellulose fiber to a specific range to thereby provide an appropriate unevenness in fiber length.

The cellulose fiber dispersed in the composite material of the present invention preferably contains a cellulose fiber having a fiber length of 0.3 mm or more. Mechanical strength such as flexural strength can be further improved by containing the cellulose fiber having a fiber length of 0.3 mm or more. From this point of view, it is more preferable to contain a cellulose fiber having a fiber length of 1 mm or more.

Further, in the composite material of the present invention, the length weighted average fiber length of the cellulose fiber in the composite material is preferably 0.3 mm or more. Mechanical strength such as flexural strength can be further improved by adjusting the length weighted average fiber length to 0.3 mm or more. From this point of view, the length weighted average fiber length of the cellulose fiber is more preferably 0.5 mm or more, and more preferably 0.7 mm or more. The length weighted average fiber length of the cellulose fiber in the composite material is ordinarily 1.3 mm or less.

The resin constituting the composite material of the present invention includes various types of thermoplastic resins and thermosetting resins, and preferably contains a thermoplastic resin in view of formability. Specific examples thereof include polyolefin resins such as polyethylene resin and polypropylene resin; thermoplastic resins such as polyvinyl chloride resin, acrylonitrile-butadiene-styrene copolymer resin (ABS resin), acrylonitrile-styrene copolymer resin (AS resin), polyamide resin (nylon), polyethylene terephthalate resin, polybutylene terephthalate resin, and polystyrene resin; and thermoplastic biodegradable resins such as 3-hydroxybutyrate-co-3-hydroxyhexanoate polymer resin (PHBH), polybutylene succinate resin, and polylactic acid resin. One type or two or more types of these resins can be used for the composite material of the present invention. Among them, the resin of the composite material preferably contains a polyolefin resin, and 50% by mass or more (preferably, 70% by mass or more) of the resin constituting the composite material is preferably a polyolefin resin.

The polyolefin resin is preferably a polyethylene resin or a polypropylene resin, or preferably a mixture of a polyethylene resin and a polypropylene resin (resin blend). Further, ethylene-based copolymers such as an ethylene-vinyl acetate copolymer, an ethylene-ethyl acrylate copolymer, an ethylene-methyl methacrylate copolymer, an ethylene-acrylic acid copolymer, an ethylene-methacrylic acid copolymer, an ethylene-glycidyl methacrylate copolymer, and an ethylene-propylene copolymer (copolymers containing ethylene as a constituent); and resins such as polybutene are preferable as the polyolefin resin used in the composite material of the present invention. One type of polyolefin resin may be used singly, or two or more types thereof may be used in combination. The polyolefin resin constituting the composite material of the present invention is preferably a polyethylene resin and/or a polypropylene resin, and more preferably a polyethylene resin.

Examples of the above polyethylene include low density polyethylenes (LDPE) and high density polyethylenes (HDPE). The resin constituting the composite material of the present invention is preferably a polyolefin resin. This polyolefin is preferably a polyethylene, and particularly preferably a low density polyethylene.

The composite material of the present invention may contain a plurality of types of resins as described above. Further, for example, a polyolefin resin and polyethylene terephthalate and/or nylon may be used in combination. In this case, the total amount of the polyethylene terephthalate and/or nylon is preferably 10 parts by mass or less based on 100 parts by mass of the polyolefin resin.

The above low density polyethylene means a polyethylene having a density of 880 kg/m$^3$ or more and less than 940 kg/m$^3$. The above high density polyethylene means a polyethylene having a density larger than the density of the above low density polyethylene.

The low density polyethylene may be so-called "low density polyethylene" and "ultralow density polyethylene" each having long chain branching, or linear low density polyethylene (LLDPE) in which ethylene and a small amount of α-olefin monomer are copolymerized, or further may be "ethylene-α-olefin copolymer elastomer" involved in the above density range.

The content of the resin in the composite material of the present invention is preferably 30% by mass or more, preferably 40% by mass or more, and more preferably 50% by mass or more. Further, the content of the resin in the composite material of the present invention is ordinarily less than 99% by mass, preferably less than 95% by mass, more preferably less than 90% by mass, and also preferably less than 85% by mass.

Incidentally, when the total content of the cellulose fiber and resin in the composite material is less than 100% by mass, the remainder can contain, for example, components described later as appropriate according to the purpose or raw materials to be used.

The composite material of the present invention is preferably in the form in which aluminum is dispersed in the resin, in addition to the cellulose fiber. The thermal conductivity, visibility, light shielding property, and lubricity of the composite material are improved by containing aluminum. When aluminum is dispersed in the resin of the composite material of the present invention, the content of the aluminum is preferably 1% by mass or more and 30% by mass or less in the composite material. The processability of the composite material can be further improved by adjusting the content of the aluminum to a level within this range, and a lump of aluminum becomes harder to be formed during processing of the composite material. This aluminum can be derived from an aluminum thin film layer of polyethylene laminated paper as a raw material. In the aluminum thin film layer of the polyethylene laminated paper, aluminum is not melted during melt-kneading, but is gradually sheared and micronized by shear force during kneading.

When thermal conductivity, flame retardancy, and the like are considered in addition to the viewpoint of the processability, the content of the aluminum in the composite material of the present invention is preferably 5% by mass or more and 20% by mass or less.

In the aluminum dispersed in the composite material of the present invention, the average of the X-Y maximum length of individual aluminum is preferably 0.02 to 2 mm, and more preferably 0.04 to 1 mm. The average of the X-Y maximum length is taken as the average of the X-Y maximum lengths measured by using the image analysis software as described later.

When the composite material contains aluminum, this aluminum preferably contains an aluminum dispersoid having an X-Y maximum length of 0.005 mm or more. The proportion of the number of aluminum dispersoids having an X-Y maximum length of 1 mm or more in the number of aluminum dispersoids having an X-Y maximum length of 0.005 mm or more is preferably less than 1%. The processability of the composite material can be further improved by adjusting this proportion to a level less than 1%, the lump of aluminum becomes harder to be formed during processing of the composite material.

Further, lubricity can be improved by containing aluminum, and for example, even when formed sheets of the composite material obtained by forming the composite material are placed in a state of being stacked, the formed sheets are hard to be closely adhered to each other, and thus are easy to be peeled. From the viewpoint of effectively exhibiting such effects of aluminum, aluminum in the composite material preferably has a scale-like structure, and further at least a part of aluminum preferably has a scale-like bent structure.

Further, lubricity at normal temperature between formed bodies of the composite material is improved by containing aluminum, whereas adhesiveness at the time of thermally fusing property the composite material to metal is improved. When the composite material containing aluminum is thermally fused to an aluminum foil, the composite material can exhibit a peel strength of, for example, 1.0 N/10 mm or more between the aluminum foil. This peel strength is the average of peel strengths observed when a sheet of a composite material and an aluminum foil having a thickness of 0.1 mm are thermally fused at 170° C. for 5 minutes at 1 kg/cm² by heat pressing, the obtained material is cut out into a strip having a width of 25 mm, and then the aluminum foil is peeled off at 23° C. in a direction at 900 at a rate of 50 mm/min.

The composite material of the present invention can be in the form in which resin particles different from the polyolefin resin are further dispersed in the polyolefin resin. A composite material having further improved mechanical strength can be obtained by taking the form in which resin particles different from the polyolefin resin are dispersed. In the resin particle, the maximum diameter is preferably 10 μm or more, and more preferably 50 μm or more. It is also preferable that the maximum diameter is 10 μm or more, and the aspect ratio is 5 or more. In particular, the resin particle preferably has a scale-like shape, a maximum diameter of 10 μm or more, and an aspect ratio of 5 or more. In the composite material, the content of the resin particle is preferably 0.1% by mass or more and 30% by mass or less. The resin particle preferably contains a resin having a melting point 10° C. or more higher than the melting point of the polyolefin resin which becomes a matrix. The resin particle also preferably contains a resin having a melting point at 170° C. or more and/or a resin exhibiting an endothermic peak at 170° C. or more and 350° C. or less measured by differential scanning calorimetry. This allows the resin particles to remain when the formed body is formed by using the composite material, and thus enables to further improve the strength of the resin composite material. Examples of the resin particle include resin particles containing at least one type of polyethylene terephthalate, polybutylene terephthalate, and polyamide, and among them, polyethylene terephthalate is preferable.

At least a part of the above resin and cellulose fiber constituting the composite material of the present invention can be derived from a recycled material. At least a part of the aluminum, polypropylene, polyethylene terephthalate, and nylon, which can be contained in the composite material of the present invention, can also be derived from a recycled material. The production cost of the composite material can be suppressed by utilizing the recycled material.

Examples of the recycled material include polyethylene laminated paper having paper and a polyethylene thin film layer, polyethylene laminated paper having paper, a polyethylene thin film layer, and an aluminum thin film layer, and a beverage pack and/or food pack made of these processed papers, or waste paper, and recycled resin. Use of a plurality types of these materials is possible. More preferably, a polyethylene thin film piece to which a cellulose fiber is adhered, obtained by processing the above laminated paper and/or beverage/food pack by a pulper to strip off and remove a paper portion (hereinafter, referred to as "cellulose fiber-adhering polyethylene thin film piece") is used as the recycled material. When the laminated paper and/or the beverage/food pack have an aluminum thin film layer, aluminum is also adhered to the cellulose fiber-adhering polyethylene thin film piece.

When such a recycled material is used as a raw material, the composite material of the present invention can also be obtained by, for example, melt-kneading described later.

In the composite material of the present invention, the moisture content is preferably less than 1% by mass. The moisture content is the weight loss (% by mass) when a thermogravimetric analysis (TGA) is performed from 23° C. to 120° C. at a heating rate of +10° C./min under a nitrogen atmosphere within 6 hours after production of the composite material.

The composite material of the present invention may contain at least one type of compound of a metal salt of organic acid, organic acid, and silicone. A composite material containing these compounds improves flowability during heating and prevents forming defects during forming. Preferred examples of the compound include metal salts of fatty acids such as zinc stearate and sodium stearate, and fatty acids such as oleic acid and stearic acid.

The composite material of the present invention may contain an inorganic material. Flexural modulus, impact resistance, and flame retardancy can be improved by containing the inorganic material. Examples of the inorganic material include calcium carbonate, talc, clay, magnesium oxide, aluminum hydroxide, magnesium hydroxide, and titanium oxide.

The composite material of the present invention may contain a flame retardant, an antioxidant, a stabilizer, a weathering agent, a compatibilizer, an impact improver, a modifier, or the like according to the purpose. The composite material of the present invention can contain an oil component or various types of additives for improving processability. Examples thereof include paraffin, modified polyethylene wax, stearate, hydroxy stearate, a vinylidene fluoride-based copolymer such as a vinylidene fluoride-hexafluoropropylene copolymer, and organic modified siloxane.

The composite material of the present invention can also contain carbon black, various pigments and dyes. The composite material of the present invention can contain a metallic luster colorant. The composite material of the present invention can also contain an electrical conductivity-imparting component such as electrically conductive carbon black. Further, the composite material of the present invention can also contain a thermal conductivity-imparting component.

The composite material of the present invention may be crosslinked. Examples of the crosslinking agent include organic peroxide, and specific examples include dicumyl peroxide. The composite material of the present invention may be in a crosslinked form by a silane crosslinking method.

The shape of the composite material of the present invention is not particularly limited. For example, the composite material of the present invention can be in the form of pellets. The composite material of the present invention may also be formed into a desired shape. When the composite material of the present invention is in the form of pellets, this pellet is suitable as a material constituting a formed article (resin product).

The application of the composite material of the present invention is not particularly limited, and the composite material of the present invention can be widely used as various types of components and raw materials thereof.

[Preparation of Cellulose Fiber-Dispersing Resin Composite Material]

Subsequently, preferred embodiments of a method of producing the composite material of the present invention will be described below. The composite material of the present invention is not limited to those obtained by the following method as long as the definitions of the present invention are satisfied.

The composite material of the present invention can be in the form of containing a desired cellulose fiber by adjustment of the kneading condition upon kneading and addition of additives, or selection or adjustment of blending of a cellulose material to be used. For example, the fiber length distribution of the cellulose fiber in the obtained composite material can be adjusted by the kneading time, kneading speed, kneading temperature, addition amount of additives such as water, addition timing, and the like. At this time, the average fiber length of the cellulose fiber tends to vary by kneading, and it is therefore important to perform adjustment in consideration of this point.

For example, when the energy charge amount during kneading is increased by increasing the kneading time or kneading speed, the dispersibility of the cellulose fiber is increased to some extent, but the fiber length tends to be decreased. This reduction in fiber length disadvantageously acts in improvement of the mechanical strength of the composite material. That is, increase in energy charge amount during kneading often provides decrease in fiber length and narrow fiber length distribution at the same time. Therefore, these are need to be controlled to a desired range.

Addition of water makes the fiber length distribution of the fiber narrower relative to the average fiber length of the fiber in some cases, although it depends on the kneading condition. The reason for this is not clear, but it is presumed that the polar interaction between water and the cellulose fiber, alleviation effect provided by water against share force during kneading, and the like work. In particular, when laminated paper is used as a cellulose material, or when a cellulose-adhering resin piece which is the remainder obtained by removing paper components from the laminated paper to some extent is used as a cellulose material, the fiber length distribution in the obtained composite material tends to vary depending on the kneading condition and the like.

The composite material of the present invention is preferably obtained by melt-kneading the resin and the cellulose material while the conditions are adjusted in consideration of the above descriptions.

Typical kneading devices such as a kneader and a twin screw extruder can be applied to the melt-kneading. Preferably, a batch type kneading device such as a kneader can be applied to the melt-kneading. With the twin screw extruder, kneading becomes excessive in some cases, resulting in short cellulose fiber length and too narrow distribution of cellulose fiber length. Therefore, the twin screw extruder cannot sufficiently improve the mechanical strength of the composite material in some cases.

The batch type kneader such as a kneader easily controls the cellulose fiber length and the fiber length distribution to a desired range. For example, when a kneader which is a batch type kneader is used, the fiber length distribution can be adjusted to a desired range by adding water during kneading, thus enabling to increase the mechanical strength of the composite material. When water is added from the beginning upon kneading, the distribution of the cellulose fiber length in the obtained composite material becomes narrow. Therefore, there is a tendency that the mechanical strength of the composite material cannot be sufficiently improved. This is because the time during which the cellulose fiber is in contact with water in a state in which the resin is not melted increases, as a result of which the action of water on the cellulose fiber becomes excessive. Meanwhile, when water is not added, the distribution of the cellulose fiber length becomes wide. Therefore, there is a tendency that the mechanical strength of the composite material cannot be sufficiently improved, or the strength of the composite material tends to vary. This is because when water is not added and cellulose fibers such as cellulose fibers derived from paper are agglutinated, such agglutination is hard to be released, and shearing during kneading tends to act on only a part of the fiber, and micronized fibers are therefore further micronized.

Here, "melt-kneading" means kneading at a temperature at which the resin (thermoplastic resin) in the raw material is melted. The melt-kneading is preferably performed at a temperature and treatment time at which the cellulose fiber is not deteriorated. The expression "the cellulose fiber is not deteriorated" means that the cellulose fiber does not cause significant discoloration, burning or carbonization.

The temperature in the melt-kneading (temperature of the melt-knead product) is, for example, preferably 110 to 280°

C., and more preferably 130 to 220° C. when a case of using a polyethylene resin is taken as an example.

In the melt-kneading, the used amount of the cellulose material is preferably adjusted so that the content of the cellulose fiber in the obtained composite material is within the above preferable range.

Examples of the cellulose material include a material mainly containing cellulose, and more specifically, examples thereof include pulp, paper, waste paper, paper powder, regenerated pulp, paper sludge, laminated paper, and broken paper of laminated paper.

The paper and waste paper may contain a cellulose fiber, a filler (kaolin or talc, for example) generally contained in order to enhance the whiteness of the paper, a sizing agent, and the like. Here, the sizing agent is an additive to be added for the purpose of suppressing permeability of liquid such as ink into the paper, preventing set-off or blurring, and providing the paper with a certain degree of water proofness. As a main agent, rosin soap, alkylketene dimer, alkenyl succinic anhydride, polyvinyl alcohol, and the like are used. As a surface sizing agent, oxidized starch, a styrene-acryl copolymer, a styrene-methacryl copolymer and the like are used. For example, various types of additives which are contained in paper or waste paper, an ink component, lignin, and the like may be contained.

The laminated paper may contain a polyethylene resin, a cellulose fiber, a filler (kaolin or talc, for example) generally contained in order to enhance the whiteness of the paper, a sizing agent, and the like. Here, the sizing agent is an additive to be added for the purpose of suppressing permeability of liquid such as ink into the paper, preventing set-off or blurring, and providing the paper with a certain degree of water proofness. As a main agent, rosin soap, alkylketene dimer, alkenyl succinic anhydride, polyvinyl alcohol, and the like are used. As a surface sizing agent, oxidized starch, a styrene-acryl copolymer, a styrene-methacryl copolymer and the like are used. For example, various types of additives which are contained in the laminated paper as the raw material, an ink component, and the like may be contained.

The pulp includes mechanical pulps and chemical pulps, and the mechanical pulp contains lignin and contaminants. Meanwhile, the chemical pulp hardly contains lignin, but contains contaminants other than lignin in some cases. For the cellulose amount in the cellulose raw material such as pulp, paper, waste paper, paper powder, regenerated pulp, paper sludge, laminated paper, and broken paper of the laminated paper used in the present invention, there is a difference in the cellulose amount in appearance due to, for example, influence of contaminants and additives in each material, or influence of undegraded components of cellulose which is out of the measurement temperature range in the thermogravimetric analysis of the cellulose amount. In the present invention, the cellulose fiber amount determined by [Formula I] in the thermogravimetric analysis was used as the cellulose fiber amount.

[Formed Body]

The formed body of the present invention is a formed body formed by using the composite material of the present invention into a desired shape. Examples of the formed body of the present invention include formed bodies of various structures such as a sheet form, a plate form, and a tubular form. Examples of the tubular formed body include a straight tube with a cross section of a substantially cylindrical shape or a square shape, a curved tube, a corrugated tube to which a corrugated shape is imparted. Examples of the tubular formed body also include divided bodies obtained by dividing the tubular formed body such as the straight tube with a cross section of a substantially cylindrical shape or a square shape, the curved tube, the corrugated tube to which a corrugated shape is imparted into two pieces, for example. The formed body of the present invention can also be used as a joint member for the tube as well as members for civil engineering, building materials, automobiles, or protection of electrical cables. The formed body of the present invention can be obtained by subjecting the composite material of the present invention to ordinary forming means such as injection molding, extrusion molding, press molding, and blow molding.

[Composite Member]

A composite member can be obtained by combining the formed body of the present invention and another material (component). The form of this composite member is not particularly limited. For example, the composite member can be a composite member having a laminate structure in which a layer composed of the formed body of the present invention and a layer composed of another material are combined. This composite member preferably has a tubular structure. Further, as the other material constituting the composite member in combination with the formed body of the present invention, for example, a thermoplastic resin material, a metal material, and the like can be exemplified.

For example, the composite material of the present invention can be used for being joined to a metal to form a composite. This composite can be a laminate including a layer of the composite material of the present invention and a metal layer. The composite is also preferably a coated metal tube having a coating layer, in which the composite material of the present invention is used in the outer circumference and/or inner circumference of a metal tube. The coated metal tube can be used as, for example, an electromagnetic wave shielding tube. The composite material of the present invention and metal are preferably joined in the form in which both are directly bonded. This joining can be performed by an ordinary method such as thermal fusing and the like. The composite material of the present invention can also be used as an adhesive sheet. For example, in order to bond metal and a polyolefin resin material, the composite material of the present invention can be used as an adhesive resin layer by interposing the composite material between the metal and the polyolefin resin material. Further, the composite material of the present invention can be used as a hot melt adhesive.

The composite member of the present invention can be suitably used as a member for civil engineering, building materials or automobiles, or a raw material for these members.

When the composite material of the present invention is joined to metal to form a composite, the type of the metal is not particularly limited. The metal preferably contains at least one type of aluminum, copper, steel, an aluminum alloy, a copper alloy, stainless steel, a magnesium alloy, a lead alloy, silver, gold, and platinum. Above all, preferably, the metal contains at least one type of aluminum, an aluminum alloy, copper, and a copper alloy, and more preferably, the metal is at least one type of aluminum, an aluminum alloy, copper, and a copper alloy. The metal also preferably contains aluminum and/or an aluminum alloy, and is also preferably aluminum and/or an aluminum alloy.

EXAMPLES

The present invention will be described in more detail based on examples given below, but the invention is not meant to be limited by these. A measurement method and an evaluation method for each indicator in the present invention are as follows.

[Cellulose Content in Composite Material]

A composite material sample (10 mg) which has been dried in advance under the atmosphere at 80° C.×1 hour is subjected to a thermogravimetric analysis (TGA) from 23° C. to 400° C. under a nitrogen atmosphere at a heating rate of +10° C./min. Then, the content of cellulose fiber (% by mass) was calculated by the following [Formula I]. The same five composite material samples were prepared, and the thermogravimetric analysis was performed for each of the composite material samples in the same manner as described above. The average value of five calculated values of the contents (% by mass) of the cellulose fibers was obtained, and the average value was taken as the content (% by mass) of the cellulose fiber.

(content of cellulose fiber[% by mass])=(amount of mass reduction of composite material sample at 200 to 380° C. [mg])×100/(mass of composite material sample in dried state before thermogravimetric analysis[mg])                    [Formula I]

[Length Weighted Average Fiber Length, Number Average Fiber Length, and Weight Weighted Average Fiber Length]

The length weighted average fiber length and number average fiber length were measured for a hot xylene dissolution residue (insoluble component) of the composite material in accordance with Pulps-Determination of fiber length by automated optical analysis specified by ISO 16065 2001 (JIS P8226 2006). Specifically, 0.1 to 1 g was cut out from a formed sheet of the composite material and taken as a sample, and this sample was wrapped with a 400-mesh stainless steel mesh, and immersed into 100 mL of xylene at 138° C. for 24 hours. Next, the sample was pulled up therefrom, and then the sample was dried in vacuum at 80° C. for 24 hours. The length weighted average fiber length, number average fiber length, and weight weighted average fiber length were determined by using the hot xylene dissolution residue (insoluble component) of the composite material thus obtained, in accordance with the Pulps-Determination of fiber length by automated optical analysis. MORFI COMPACT, manufactured by TECHPAP was used in this measurement.

[Tensile Strength]

A test piece was prepared by injection molding, and tensile strength was measured for a No. 2 test piece in accordance with JIS K 7113 1995. A unit is MPa.

[Flexural Strength and Flexural Modulus]

Flexural strength and flexural modulus were measured for a 4 mm-thick sample at a flexural rate of 2 mm/min in accordance with JIS K 7171 2016. More specifically, a test piece (thickness: 4 mm, width: 10 mm, and length: 80 mm) was prepared by injection molding, a load was applied to the test piece with a span of 64 mm, a curvature radius of 5 mm at a supporting point and an action point, and a test speed of 2 mm/min, and a flexural test was conducted in accordance with JIS K 7171 2016, and flexural strength (MPa) and flexural modulus (MPa) were determined.

Here, the flexural modulus Ef can be determined by determining flexural stress σf1 measured at a deflection amount in strain 0.0005 (εf1) and flexural stress σf2 measured at a deflection amount in strain 0.0025 (εf2), and dividing a difference therebetween by a difference between respective amounts of strain corresponding thereto, namely, according to the following formula: Ef=(σf2−σf1)/(εf2−εf1).

In this case, the deflection amount S for determining the flexural stress can be determined according to the following formula:

$$S=(\varepsilon \cdot L^2)/(6 \cdot h)$$

S is deflection,
ε is flexural strain,
L is span, and
h is thickness.

[Peel Strength]

The composite material was press-molded into a sheet form having a thickness of 1 mm and a length of 20 cm. This sheet and an aluminum foil having a thickness of 0.1 mm (manufactured by UACJ Corporation, 1 N-30 material (soft), having glossy surfaces) were laminated. The laminate was pre-heated at 170° C. for 5 minutes, and then thermally fused by heat pressing at 170° C. at a pressure of 4.2 MPa for 5 minutes. The laminate thus obtained was left to stand in an environment of 23° C. for 2 days or more, and this laminate was then cut into a strip having a width of 25 mm and a length of 20 cm to prepare five samples. The aluminum foil was peeled from each of the strip samples in a direction at 90° (direction perpendicular to the sheet surface) at a speed of 50 mm/min. The average of peel strengths for a sample having the maximum peel strength and a sample having the minimum peel strength in this peeling was calculated, and the obtained average value was taken as the peel strength of the composite material.

Preparation Example 1

In Preparation Example 1, composite materials were each prepared by using a low density polyethylene and an ethylene-acrylic acid copolymer as a resin, and pulp as a cellulose material. Details will be described as the following Examples 1 and 2, and Comparative Examples 1 and 2.

Example 1

In Example 1, low density polyethylene 1 (NOVATEC LC600A, manufactured by Japan Polyethylene Corporation), pulp 1 (ARBOCEL BC200, manufactured by J. RETTENMAIER & SOHNE), and ethylene-acrylic acid copolymer 1 (Nucrel, manufactured by Dupont-Mitsui Polychemicals Co., Ltd) were mixed at the blend ratio shown in the upper rows in Table 1 (unit: parts by mass) and melt-kneaded by using a kneader to obtain a composite material. During kneading, 1.5 parts by mass of water was added. The cellulose fiber-dispersing resin composite material of Example 1 was thus obtained.

Incidentally, in this Example 1, and later Examples and Comparative Examples, the moisture content of each of the obtained composite materials was less than 1% by mass.

Example 2

In Example 2, low density polyethylene 1 (NOVATEC LC600A, manufactured by Japan Polyethylene Corporation), pulp 2 (ARBOCEL FIF400, manufactured by J. RETTENMAIER & SOHNE), and ethylene-acrylic acid copolymer 1 (Nucrel, manufactured by Dupont-Mitsui Polychemicals Co., Ltd) were mixed at the blend ratio shown in the upper rows in Table 1 (unit: parts by mass) and melt-kneaded by using a kneader to obtain a composite material. During kneading, 40 parts by mass of water was added. The cellulose fiber-dispersing resin composite material of Example 2 was thus obtained.

Comparative Example 1

Low density polyethylene 1 (NOVATEC LC600A, manufactured by Japan Polyethylene Corporation), pulp 1 (AR-BOCEL BC200, manufactured by J. RETTENMAIER & SOHNE), and ethylene-acrylic acid copolymer 1 (Nucrel, manufactured by Dupont-Mitsui Polychemicals Co., Ltd) were mixed at the blend ratio shown in the upper rows in Table 1 (unit: parts by mass) and melt-kneaded by using a kneader to obtain a composite material. In the kneading, 40 parts by mass of water was added from the beginning. The cellulose fiber-dispersing resin composite material of Comparative Example 1 was thus obtained.

Comparative Example 2

Low density polyethylene 1 (NOVATEC LC600A, manufactured by Japan Polyethylene Corporation) was used as Comparative Example 2.

The contents of cellulose fibers in Examples and Comparative Examples are shown in the middle row in Table 1, and the evaluation results and the like are shown in the lower rows in Table 1.

[Table 1]

TABLE 1

|  | Ex. 1 | CEx. 1 | Ex. 2 | CEx. 2 |
|---|---|---|---|---|
| Low density polyethylene 1 (parts by mass) | 57 | 57 | 57 | 100 |
| Pulp 1 (parts by mass) | 40 | 40 | — | — |
| Pulp 2 (parts by mass) | — | — | 40 | — |
| Ethylene-acrylic acid copolymer 1 (parts by mass) | 3 | 3 | 3 | — |
| Cellulose fiber (% by mass) | 30.4 | 29.8 | 31.9 | — |
| Length weighted average fiber length LL/number average fiber length LN | 1.15 | 1.08 | 1.30 | — |
| Length weighted average fiber length LL (μm) | 394 | 394 | 619 | — |
| Number average fiber length LN (μm) | 343 | 365 | 477 | — |
| Tensile strength (MPa) | 26.1 | 20.2 | 25.2 | 16.4 |
| Flexural strength (MPa) | 26.5 | 20.4 | 26.0 | 6.6 |
| Flexural modulus (MPa) | 1141 | 734 | 1134 | 133 |

Remarks:
'Ex.' means Example according to this invention, and 'CEx.' means Comparative Example.

As shown in the above Table 1, even in a case of using the same pulp and the same formulation amount of the raw material, the composite material of the present invention, in which the LL/LN is more than 1.1, exhibited high values in all of tensile strength, flexural strength, and flexural modulus (comparison between Example 1 and Comparative Example 1).

Further, it is found that the composite material of Example 2 in which the LL/LN is within the range defined in the present invention exhibits high values in all of tensile strength, flexural strength, and flexural modulus, and is excellent in mechanical strength.

Preparation Example 2

In Preparation Example 2, composite materials were each prepared by using a high density polyethylene as a resin and broken paper of laminated paper as a cellulose material. Also, acid-modified polyethylene resin was blended in some examples. Details will be described as the following Examples 3 to 6, and Comparative Examples 3 and 4.

Example 3

In Example 3, a material obtained by pulverizing broken paper of polyethylene laminated paper (having paper, a polyethylene thin film layer, and an aluminum thin film layer) by using a rotary cutter mill (manufactured by Horai Co., Ltd.) and high density polyethylene 1 (NOVATEC HJ490, manufactured by Japan Polyethylene Corporation) were mixed at the blend ratio shown in the upper rows in Table 2 and melt-kneaded by using a kneader to obtain a composite material. During the kneading, 30 parts by mass of water was added. The cellulose fiber-dispersing resin composite material of Example 3 was thus obtained.

Examples 4 and 5

In Examples 4 and 5, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene resin 1 (maleic acid-modified polyethylene, FUSABOND, DuPont) were mixed at the blend ratio shown in the upper rows in Table 2 and melt-kneaded by using a kneader to obtain a composite material. During the kneading, 60 parts by mass of water was added in Example 4, and 100 parts by mass of water was added in Example 5. The cellulose fiber-dispersing resin composite materials of Examples 4 and 5 were thus obtained.

Example 6

In Example 6, a material obtained by pulverizing broken paper of polyethylene laminated paper (having paper, a polyethylene thin film layer, and an aluminum thin film layer) by using a rotary cutter mill (manufactured by Horai Co., Ltd.) and high density polyethylene 1 (NOVATEC HJ490, manufactured by Japan Polyethylene Corporation) were mixed at the blend ratio shown in the upper rows in Table 2 and melt-kneaded by using a twin screw extruder to obtain a composite material. In Example 6, 60 parts by mass of water was added from the beginning of the melt-kneading. The cellulose fiber-dispersing resin composite material of Example 6 was thus obtained.

Comparative Example 3

The cellulose fiber-dispersing resin composite material of Comparative Example 3 was obtained in the same manner as in Example 3 except that water was not added during kneading in Example 3.

Comparative Example 4

High density polyethylene 1 (NOVATEC HJ490, manufactured by Japan Polyethylene Corporation) was used as Comparative Example 4.

The contents of cellulose fibers in Examples and Comparative Examples are shown in the middle row in Table 2, and the evaluation results and the like are shown in the lower rows in Table 2.

material. In Example 7, 50 parts by mass of water was added from the beginning, and 50 parts by mass of water was further added during the kneading. In Example 8, 100 parts by mass of water was added during the kneading. The cellulose fiber-dispersing resin composite materials of Examples 7 and 8 were thus obtained.

Example 9

In Example 9, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene 1 (maleic acid-modified poly-

TABLE 2

|  | Ex. 3 | CEx. 3 | Ex. 4 | Ex. 5 | Ex. 6 | CEx. 4 |
|---|---|---|---|---|---|---|
| High density polyethylene 1 (parts by mass) | 40 | 40 | 36 | 36 | 40 | 100 |
| Broken paper of laminate paper (parts by mass) | 60 | 60 | 60 | 60 | 60 | — |
| Acid-modified polyethylene resin 1 (parts by mass) | — | — | 4 | 4 | — | — |
| Cellulose fiber (% by mass) | 30.2 | 30.3 | 29.9 | 30.0 | 29.7 | — |
| Length weighted average fiber length LL/ number average fiber length LN | 1.47 | 1.51 | 1.39 | 1.37 | 1.13 | — |
| Length weighted average fiber length LL ($\mu$m) | 1177 | 1175 | 991 | 967 | 449 | — |
| Number average fiber length LN ($\mu$m) | 802 | 779 | 713 | 704 | 397 | — |
| Tensile strength (MPa) | 47.4 | 44.3 | 52.5 | 55.6 | 37.1 | 29.2 |
| Flexural strength (MPa) | 51.5 | 47.3 | 55.1 | 56.4 | 38.4 | — |
| Flexural modulus (MPa) | 3530 | 3152 | 3226 | 3381 | 3119 | — |

Remarks:
'Ex.' means Example according to this invention, and
'CEx.' means Comparative Example.

As shown in the above Table 2, even in a case of using the same cellulose material and the same formulation amount of the raw material, the composite material of the present invention in which the LL/LN is less than 1.5 exhibited high values in all of tensile strength, flexural strength, and flexural modulus (comparison between Example 3 and Comparative Example 3).

Further, it is found that the LL/LN can be adjusted to a more preferable range by replacing a part of polyethylene resin with acid-modified resin, and tensile strength and flexural strength can be further improved (Examples 4 and 5).

Preparation Example 3

In Preparation Example 3, composite materials were each prepared by blending a small amount of acid-modified polyethylene resin in the same manner as in Examples 4 and 5 of Preparation Example 2. Details will be described as the following Examples 7 to 10, and Comparative Example 5.

Examples 7 to 8

In Examples 7 and 8, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene 1 (maleic acid-modified polyethylene, FUSABOND, manufactured by DuPont) were mixed at the blend ratio shown in the upper rows in Table 3 and melt-kneaded by using a kneader to obtain a composite ethylene, FUSABOND, manufactured by DuPont) were mixed at the blend ratio shown in the upper rows in Table 3 and melt-kneaded by using a kneader to obtain a composite material. In Example 9, 100 parts by mass of water was added during the melt-kneading. The composite material thus obtained was further subjected to pulverizing treatment by a pulverizer and kneading treatment by a kneader. The treatments were alternately performed and each treatment was repeated twice. The cellulose fiber-dispersing resin composite material of Example 9 was thus obtained.

Example 10

In Example 10, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene 1 (maleic acid-modified polyethylene, FUSABOND, manufactured by DuPont) were mixed at the blend ratio shown in the upper rows in Table 3 and melt-kneaded by using a twin screw extruder to obtain a composite material. In Example 10, 100 parts by mass of water was added from the beginning of the melt-kneading. The cellulose fiber-dispersing resin composite material of Example 10 was thus obtained.

Comparative Example 5

In Comparative Example 5, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene 1 (maleic acid-modified polyethylene, FUSABOND, manufactured by DuPont) were mixed at the blend ratio shown in the upper rows in Table 3 and melt-kneaded by using a kneader to obtain a composite material. In Comparative Example 5, 100 parts by mass of water was added from the beginning of the kneading. The composite material thus obtained was further subjected to pulverizing treatment by a pulverizer and kneading treatment by a kneader. The treatments were alternately performed and each treatment was repeated twice. The cellulose fiber-dispersing resin composite material of Comparative Example 5 was thus obtained.

The contents of cellulose fibers in Examples and Comparative Examples are shown in the middle row in Table 3, and the evaluation results and the like are shown in the lower rows in Table 3. Note that, in the rows of satisfaction for each expression in the following table, ○ means being satisfied (satisfying corresponding expression), x means not being satisfied (not satisfying corresponding expression).

resin, and using waste paper as a cellulose material. Details will be described as the following Examples 11 to 13.

Examples 11 to 13

High density polyethylene 1 (NOVATEC HJ490, manufactured by Japan Polyethylene Corporation), acid-modified polyethylene 1 (maleic acid-modified polyethylene, FUSABOND, DuPont), and waste paper were mixed at the blend ratio shown in the upper rows in Table 4 and melt-kneaded by using a kneader to obtain a composite material. During the kneading, 1.7 parts by mass of water was added.

Here, in Example 11, a finely cut material obtained by shredding office paper by a shredder was used as waste paper. In Example 12, a pulverized product of newspaper (using a rotary cutter mill (manufactured by Horai Co., Ltd.)) was used as waste paper. In Example 13, a pulverized product of broken paper of polyethylene laminated paper (having paper, a polyethylene thin film layer, and an aluminum thin film layer) (using a rotary cutter mill (manufactured by Horai Co., Ltd.)) was used as waste paper.

TABLE 3

|  | Ex. 7 | Ex. 8 | Ex. 9 | Ex. 10 | CEx. 5 |
|---|---|---|---|---|---|
| High density polyethylene 1 (parts by mass) | 57 | 57 | 57 | 57 | 57 |
| Broken paper of laminate paper (parts by mass) | 40 | 40 | 40 | 40 | 40 |
| Acid-modified polyethylene resin 1 (parts by mass) | 3 | 3 | 3 | 3 | 3 |
| Cellulose fiber (% by mass) | 20.3 | 20.4 | 19.7 | 20.1 | 19.8 |
| Length weighted average fiber length LL/ number average fiber length LN | 1.33 | 1.35 | 1.25 | 1.14 | 1.07 |
| Weight weighted average fiber length LW/ number average fiber length LN | 1.81 | 1.97 | 1.65 | — | — |
| Length weighted average fiber length LL (μm) | 773 | 713 | 589 | 348 | 353 |
| Number average fiber length LN (μm) | 580 | 529 | 472 | 306 | 331 |
| Weight weighted average fiber length LW (μm) | 1051 | 1041 | 779 | — | — |
| LL × 0.0005 + 1.05 | 1.44 | 1.41 | 1.34 | 1.22 |  |
| LL × 0.0005 + 1.00 | 1.39 | 1.36 | 1.29 | 1.17 |  |
| LL × 0.0005 + 0.95 | 1.34 | 1.31 | 1.24 | 1.12 |  |
| LL × 0.0005 + 0.85 | 1.24 | 1.21 | 1.14 | 1.02 |  |
| Satisfaction of [Expression 3] | ○ | ○ | ○ | ○ |  |
| Satisfaction of [Expression 3-2] | ○ | ○ | ○ | ○ |  |
| Satisfaction of [Expression 3-3] | ○ | x | x | x |  |
| Satisfaction of [Expression 3-4] | ○ | ○ | ○ | ○ |  |
| Tensile strength (MPa) | 51.6 | 47.7 | 45.4 | 43.3 | 37.8 |
| Coefficient of variation of tensile strength | 0.004 | 0.006 | 0.014 | — | — |
| Flexural strength (MPa) | 49.7 | 45.8 | 46.2 | 42.4 | 35.2 |
| Flexural modulus (MPa) | 2740 | 2317 | 2475 | 2254 | 2249 |

Remarks:
'Ex.' means Example according to this invention, and 'CEx.' means Comparative Example.

As shown in the above Table 3, it is found that even in a case of using the same cellulose material and the same formulation amount of the raw material, tensile strength and flexural strength are improved in the composite material of the present invention in which the LL/LN is more than 1.1 (comparison between Example 10 and Comparative Example 5).

Further, it is found that the composite materials which satisfy the definitions of the present invention are all excellent in mechanical strength, and in particular, the mechanical strength is further improved when [Expression 3] to [Expression 3-4] are satisfied (Examples 7 to 10).

Preparation Example 4

In Preparation Example 4, composite materials were each prepared by using a high density polyethylene as a resin, blending a small amount of acid-modified polyethylene The contents of cellulose fibers in Examples are shown in the middle row in Table 4, and the evaluation results and the like are shown in the lower rows in Table 4.

TABLE 4

|  | Ex. 11 | Ex. 12 | Ex. 13 |
|---|---|---|---|
| High density polyethylene 1 (parts by mass) | 81 | 81 | 78 |
| Waste paper (parts by mass) | 17 | 17 | 20 |
| Acid-modified polyethylene resin 1 (parts by mass) | 2 | 2 | 2 |
| Cellulose fiber (% by mass) | 10.7 | 10.6 | 10.1 |
| Length weighted average fiber length LL/ number average fiber length LN | 1.18 | 1.24 | 1.32 |
| Length weighted average fiber length LL (μm) | 520 | 502 | 691 |
| Number average fiber length LN (μm) | 442 | 406 | 525 |
| LL × 0.0005 + 1.05 | 1.31 | 1.30 | 1.40 |
| LL × 0.0005 + 1.00 | 1.26 | 1.25 | 1.35 |

TABLE 4-continued

| | Ex. 11 | Ex. 12 | Ex. 13 |
|---|---|---|---|
| LL × 0.0005 + 0.95 | 1.21 | 1.20 | 1.30 |
| LL × 0.0005 + 0.85 | 1.11 | 1.10 | 1.20 |
| Satisfaction of [Expression 3] | ○ | ○ | ○ |
| Satisfaction of [Expression 3-2] | ○ | ○ | ○ |
| Satisfaction of [Expression 3-3] | ○ | x | x |
| Satisfaction of [Expression 3-4] | ○ | ○ | ○ |
| Tensile strength (MPa) | 39.2 | 36.9 | 38.2 |
| Flexural strength (MPa) | 35.0 | 34.0 | 34.9 |
| Flexural modulus (MPa) | 1722 | 1633 | 1669 |

Remarks: 'Ex.' means Example according to this invention.

It is found from the results in Table 4 that in the composite materials of the present invention, mechanical strength is further improved when [Expression 3] to [Expression 3-4] are satisfied (comparison between Example 11, and Examples 12 and 13).

Preparation Example 5

In Preparation Example 5, composite materials were each prepared by using a low density polyethylene as a resin and broken paper of laminated paper as a cellulose material. Details will be described as the following Examples 14 to 16, and Comparative Example 6.

Example 14

In Example 14, a material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation) were mixed at the blend ratio shown in the upper rows in Table 5 and melt-kneaded by using a kneader to obtain a composite material. During the kneading, 40 parts by mass of water was added. The cellulose fiber-dispersing resin composite material of Example 14 was thus obtained.

Example 15

In Example 15, a material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation)

were mixed at the blend ratio shown in the upper rows in Table 5 and melt-kneaded by using a kneader to obtain a composite material. An operation of adding and mixing 10 parts by mass of water during kneading was performed four times (total formulation amount of water was 40 parts by mass). The cellulose fiber-dispersing resin composite material of Example 15 was thus obtained.

Example 16

In Example 16, a material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation) were mixed at the blend ratio shown in the upper rows in Table 5 and melt-kneaded by using a kneader. During the kneading, 40 parts by mass of water was added. The obtained composite material was further subjected to pulverizing treatment by a pulverizer and kneading treatment by a kneader. The treatments were alternately performed and each treatment was repeated twice. The cellulose fiber-dispersing resin composite material of Example 16 was thus obtained.

Comparative Example 6

In Comparative Example 6, a material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation) were mixed at the blend ratio shown in the upper rows in Table 5 and melt-kneaded by using a kneader. In the kneading, 40 parts by mass of water was added from the beginning. The obtained composite material was further subjected to pulverizing treatment by a pulverizer and kneading treatment by a kneader. The treatments were alternately performed and each treatment was repeated twice. The cellulose fiber-dispersing resin composite material of Comparative Example 6 was thus obtained.

The contents of cellulose fibers in Examples and Comparative Examples are shown in the middle row in Table 5, and the evaluation results and the like are shown in the lower rows in Table 5.

[Table 5]

TABLE 5

| | Ex. 14 | Ex. 15 | Ex. 16 | CEx. 6 |
|---|---|---|---|---|
| Low density polyethylene 1 (parts by mass) | 60 | 60 | 60 | 60 |
| Broken paper of laminate paper (parts by mass) | 40 | 40 | 40 | 40 |
| Cellulose fiber (% by mass) | 19.9 | 20.2 | 19.7 | 19.9 |
| Length weighted average fiber length LL/number average fiber length LN | 1.31 | 1.29 | 1.17 | 1.08 |
| Length weighted average fiber length LL (μm) | 721 | 737 | 379 | 373 |
| Number average fiber length LN (μm) | 552 | 570 | 325 | 345 |
| LL × 0.0005 + 1.05 | 1.41 | 1.42 | 1.24 | |
| LL × 0.0005 + 1.00 | 1.36 | 1.37 | 1.19 | |
| LL × 0.0005 + 0.95 | 1.31 | 1.32 | 1.14 | |
| LL × 0.0005 + 0.85 | 1.21 | 1.22 | 1.04 | |

TABLE 5-continued

|  | Ex. 14 | Ex. 15 | Ex. 16 | CEx. 6 |
|---|---|---|---|---|
| Satisfaction of [Expression 3] | ○ | ○ | ○ |  |
| Satisfaction of [Expression 3-2] | ○ | ○ | ○ |  |
| Satisfaction of [Expression 3-3] | x | ○ | x |  |
| Satisfaction of [Expression 3-4] | ○ | ○ | ○ |  |
| Tensile strength (MPa) | 27.1 | 28.8 | 21.3 | 17.6 |
| Flexural strength (MPa) | 25.8 | 26.8 | 21.1 | 17.3 |
| Flexural modulus (MPa) | 1081 | 1695 | 971 | 727 |

Remarks: 'Ex.' means Example according to this invention, and
'CEx.' means Comparative Example.

As shown in the above Table 5, it is found that even in a case of using the same cellulose material and the same formulation amount of the raw material, all of tensile strength, flexural strength, and flexural modulus are improved in the composite material of the present invention in which the LL/LN is more than 1.1 (comparison between Example 16 and Comparative Example 6). Further, it is found that the composite materials which satisfy the definitions of the present invention are all excellent in mechanical strength, and in particular, the mechanical strength is further improved when [Expression 3] to [Expression 3-4] are satisfied (Examples 14 to 16).

Also, the content of aluminum in the composite material obtained in Example 15 was 8.1% by mass. The cross section of the flexural test piece for the composite material of Example 15 was observed, and a folded structure in which aluminum is folded was observed. Further, the peel strength between the aluminum foil was measured for the composite material of Example 15 by the above method, and the peel strength was 1.7 N/10 mm. The peel strength between the aluminum foil for a single body of polyethylene which is same as that used in Example 15 (which is Comparative Example 2) was 0.8 N/10 mm. The composite material of Example 15, which contains laminated paper as a raw material and aluminum and in which the cellulose fiber has a specific fiber length distribution as described above, had high peel strength and excellent adhesiveness to metal.

Preparation Example 6

In Preparation Example 6, a composite material was prepared by using a high density polyethylene as the resin, blending a small amount of acid-modified polyethylene resin, and using broken paper of laminated paper as the cellulose material. Details will be described as the following Examples 17 and 18.

Example 17

In Example 17, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene 1 (maleic acid-modified polyethylene, FUSABOND, manufactured by DuPont) were mixed at the blend ratio shown in the upper rows in Table 6 and melt-kneaded by using a kneader to obtain a composite material. During the kneading, 100 parts by mass of water was added. The cellulose fiber-dispersing resin composite material of Example 17 was thus obtained.

Example 18

In Example 18, a material obtained by pulverizing broken paper of polyethylene laminated paper (having paper, a polyethylene thin film layer, and an aluminum thin film layer) by using a rotary cutter mill (manufactured by Horai Co., Ltd.), high density polyethylene 1 (NOVATEC HJ490, manufactured by Japan Polyethylene Corporation), and acid-modified polyethylene 1 (maleic acid-modified polyethylene, FUSABOND, manufactured by DuPont) were mixed at the blend ratio shown in the upper rows in Table 6 and melt-kneaded by using a kneader to obtain a composite material. During the kneading, 5 parts by mass of water was added. The cellulose fiber-dispersing resin composite material of Example 18 was thus obtained.

The contents of cellulose fibers in Examples are shown in the middle row in Table 6, and the evaluation results and the like are shown in the lower rows in Table 6. Further, the results of Examples 8 and 5 are listed together for reference. [Table 6]

TABLE 6

|  | Ex. 8 | Ex. 5 | Ex. 17 | Ex. 18 |
|---|---|---|---|---|
| High density polyethylene 1 (parts by mass) | 57 | 36 | 25 | 21 |
| Broken paper of laminate paper (parts by mass) | 40 | 60 | 70 | 65 |
| Acid-modified polyethylene resin 1 (parts by mass) | 3 | 4 | 5 | 4 |
| Cellulose fiber (% by mass) | 20.4 | 30.0 | 36.5 | 32.8 |
| Length weighted average fiber length LL/number average fiber length LN | 1.35 | 1.37 | 1.29 | 1.49 |
| Weight weighted average fiber length LW/number average fiber length LN | 1.97 | 2.04 | 2.24 | 2.41 |
| Length weighted average fiber length LL (μm) | 713 | 967 | 855 | 862 |
| Number average fiber length LN (μm) | 529 | 704 | 665 | 579 |
| Weight weighted average fiber length LW (μm) | 1041 | 1433 | 1487 | 1393 |
| Tensile strength (MPa) | 47.7 | 55.6 | 48.7 | 44.1 |
| Coefficient of variation of tensile strength | 0.006 | 0.025 | 0.071 | 0.102 |
| Flexural strength (MPa) | 45.8 | 56.4 | 57.4 | 51.9 |
| Flexural modulus (MPa) | 2317 | 3381 | 3892 | 3611 |

Remarks: 'Ex.' means Example according to this invention.

As shown in the above Table 6, when the LW/LN becomes large, the coefficient of variation of tensile strength tends to become large (Example 18).

Preparation Example 7

In Preparation Example 7, composite materials were each prepared by using a high density polyethylene as a resin, blending a small amount of acid-modified polyethylene resin, and using waste paper as a cellulose material. Details will be described as the following Examples 19 and 20.

Examples 19 and 20

High density polyethylene 1 (NOVATEC HJ490, manufactured by Japan Polyethylene Corporation), acid-modified polyethylene 1 (maleic acid-modified polyethylene, FUSABOND, DuPont), and waste paper were mixed at the blend ratio shown in the upper rows in Table 7 and melt-kneaded by using a kneader to obtain a composite material. During the kneading, 3.3 parts by mass of water was added.

Here, in Example 19, a finely cut material obtained by shredding office paper by a shredder was used as waste paper. In Example 20, a pulverized product of newspaper (using a rotary cutter mill (manufactured by Horai Co., Ltd.)) was used as waste paper.

The contents of cellulose fibers in Examples are shown in the middle row in Table 7, and the evaluation results and the like are shown in the lower rows in Table 7. Further, a graph showing the fiber length distribution of each example is shown in FIG. 1. In FIG. 1, A is the composite material of Example 19, and B is the composite material of Example 20.

[Table 7]

TABLE 7

|  | Example 19 | Example 20 |
|---|---|---|
| High density polyethylene 1 (parts by mass) | 64 | 64 |
| Waste paper (parts by mass) | 33 | 33 |
| Acid-modified polyethylene resin 1 (parts by mass) | 3 | 3 |
| Cellulose fiber (% by mass) | 21.2 | 20.3 |
| Length weighted average fiber length LL/ number average fiber length LN | 1.18 | 1.34 |
| Length weighted average fiber length LL (μm) | 530 | 680 |
| Number average fiber length LN (μm) | 448 | 509 |
| LL × 0.0005 + 1.05 | 1.32 | 1.39 |
| LL × 0.0005 + 1.00 | 1.27 | 1.34 |
| Satisfaction of [Expression 3] | ○ | ○ |
| Satisfaction of [Expression 3-2] | ○ | × |
| Tensile strength (MPa) | 60.5 | 54.3 |
| Flexural strength (MPa) | 50.0 | 48.3 |
| Flexural modulus (MPa) | 2403 | 2487 |

As shown in Table 7, comparing Example 19 and Example 20, length weighted average fiber length is smaller in Example 19 than Example 20. Meanwhile, tensile strength and flexural strength are higher in Example 19 than Example 20. It has been considered that a cellulose fiber having a longer fiber length generally has improved mechanical properties. However, the results of the above Table 7 show that even when the fiber length of the cellulose fiber is short, the mechanical properties of the composite material can be effectively improved by suppressing the LL/LN to a certain level (for example, adjusting the LL/LN to less than 1.3, or taking a configuration which satisfies [Expression 3-2]).

Preparation Example 8

In Preparation Example 8, composite materials were each prepared by using polypropylene as resin and broken paper of laminated paper as a cellulose material. Details will be described as the following Examples 21 and 22, and Comparative Example 7.

Example 21

A material obtained by pulverizing broken paper of polyethylene laminated paper (having paper, a polyethylene thin film layer, and an aluminum thin film layer) by using a rotary cutter mill (manufactured by Horai Co., Ltd.) and polypropylene were mixed at the blend ratio shown in the upper rows in Table 8. As the polypropylene resin, J783HV, MI 12.7 g/min, manufactured by Prime Polymer Co., Ltd. was used. This mixture was charged into a kneader and then melt-kneaded. During the kneading, 50 parts by mass of water was charged into the kneader. The cellulose fiber-dispersing resin composite material was thus prepared.

Example 22

A material obtained by pulverizing broken paper of polyethylene laminated paper (having paper, a polyethylene thin film layer, and an aluminum thin film layer) by using a rotary cutter mill (manufactured by Horai Co., Ltd.) and polypropylene were mixed at the blend ratio shown in the upper rows in Table 8. As the polypropylene resin, J783HV, MI 12.7 g/min, manufactured by Prime Polymer Co., Ltd. was used. This mixture was melt-kneaded by using a twin screw extruder to obtain a composite material. 50 parts by mass of water was added from the beginning of the melt-kneading. The cellulose fiber-dispersing resin composite material was thus obtained.

Comparative Example 7

A cellulose fiber-dispersing resin composite material was prepared by using a polypropylene resin and broken paper of polyethylene laminated paper as a paper raw material, and changing the kneading condition. A material obtained by pulverizing broken paper of polyethylene laminated paper (having paper, a polyethylene thin film layer, and an aluminum thin film layer) by using a rotary cutter mill (manufactured by Horai Co., Ltd.) and polypropylene resin (J783HV, MI 12.7 g/min, manufactured by Prime Polymer Co., Ltd.) were mixed at the blend ratio shown in the upper rows in Table 8, and this mixture was charged into a kneader and melt-kneaded to obtain a composite material. 50 parts by mass of water was added from the beginning of the melt-kneading. The obtained composite material was further subjected to pulverizing treatment by a pulverizer and kneading treatment by a kneader. The treatments were alternately performed and each treatment was repeated twice. The cellulose fiber-dispersing resin composite material of Comparative Example 7 was thus obtained.

The compositions of the components of each composite material are shown in the middle rows in Table 8, and the evaluation results and the like are shown the lower rows in Table 8.

[Table 8]

TABLE 8

|  | Ex. 21 | Ex. 22 | CEx. 7 |
|---|---|---|---|
| Polypropylene (parts by mass) | 40 | 40 | 40 |
| Broken paper of laminate paper (parts by mass) | 60 | 60 | 60 |
| Cellulose fiber (% by mass) | 26.3 | 27.1 | 28.3 |
| Length weighted average fiber length LL/ number average fiber length LN | 1.26 | 1.13 | 1.08 |
| Length weighted average fiber length LL (μm) | 707 | 431 | 355 |

TABLE 8-continued

|  | Ex. 21 | Ex. 22 | CEx. 7 |
|---|---|---|---|
| Number average fiber length LN (μm) | 563 | 381 | 328 |
| LL × 0.0005 + 1.05 | 1.40 | 1.27 | |
| LL × 0.0005 + 1.00 | 1.35 | 1.22 | |
| LL × 0.0005 + 0.95 | 1.30 | 1.17 | |
| LL × 0.0005 + 0.85 | 1.20 | 1.07 | |
| Satisfaction of [Expression 3] | ○ | ○ | |
| Satisfaction of [Expression 3-2] | ○ | ○ | |
| Satisfaction of [Expression 3-3] | ○ | ○ | |
| Satisfaction of [Expression 3-4] | ○ | ○ | |
| Tensile strength (MPa) | 39.3 | 35.4 | 33.1 |
| Flexural strength (MPa) | 46.9 | 40.4 | 37.3 |
| Flexural modulus (MPa) | 3245 | 3025 | 2867 |

Remarks:
'Ex.' means Example according to this invention, and 'CEx.' means Comparative Example.

As shown in Table 8, the composite material of Comparative Example 7 in which the LL/LN is less than 1.1 results in inferior mechanical properties.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A cellulose fiber-dispersing resin composite material, comprising a cellulose fiber dispersed in a resin, wherein a content of the cellulose fiber is 1% by mass or more and less than 70% by mass based on the mass of the cellulose fiber-dispersing resin composite material, and wherein LL and LN satisfy the following [Expression 1-2] and [Expression 3-3]:

$$1.1 < (LL/LN) < 1.4 \qquad \text{[Expression 1-2]}$$

$$(LL/LN) < (LL \times 0.0005 + 0.95) \qquad \text{[Expression 3-3]}$$

when a length weighted average fiber length of the cellulose fiber is taken as LL, and a number average fiber length of the cellulose fiber is taken as LN, measured under the following measurement condition:

<Measurement Condition>

LL and LN are determined for the dissolution residue obtained by immersing the cellulose fiber-dispersing resin composite material in a solvent capable of dissolving the resin in the composite material, in accordance with Pulps-Determination of fiber length by automated optical analysis specified by ISO 16065 2001, wherein the length weighted average fiber length of the cellulose fiber is 520 μm or more and 991 μm or less.

2. The cellulose fiber-dispersing resin composite material according to claim 1, wherein the content of the cellulose fiber in the cellulose fiber-dispersing resin composite material is determined by the following measurement method, and wherein the content of the cellulose fiber in the cellulose fiber-dispersing resin composite material is 5% by mass or more and less than 50% by mass based on the mass of the cellulose fiber-dispersing resin composite material:

<Measurement Method> a sample of the cellulose fiber-dispersing resin composite material is subjected to a thermogravimetric analysis (TGA) under a nitrogen atmosphere at a heating rate of +10° C./min and a content of a cellulose fiber is calculated from the following [Formula I]:

(content of cellulose fiber[% by mass])=(amount of mass reduction of sample at 200 to 380° C. [mg])×100/(mass of sample before thermogravimetric analysis[mg])        [Formula I].

3. The cellulose fiber-dispersing resin composite material according to claim 1, wherein the resin comprises one type or two or more types of polyolefin resin, acrylonitrile-butadiene-styrene copolymer resin, acrylonitrile-styrene copolymer resin, polyamide resin, polyvinyl chloride resin, polyethylene terephthalate resin, polybutylene terephthalate resin, polystyrene resin, 3-hydroxybutyrate-co-3-hydroxy-hexanoate polymer resin, polybutylene succinate resin, and polylactic acid resin.

4. The cellulose fiber-dispersing resin composite material according to claim 1, wherein the resin contains a polyolefin resin, and wherein in the measurement condition of the LL and the LN, the dissolution residue obtained by immersing the resin in the composite material in the solvent capable of dissolving the resin is a hot xylene dissolution residue.

5. The cellulose fiber-dispersing resin composite material according to claim 1, comprising aluminum dispersed in the resin.

6. The cellulose fiber-dispersing resin composite material according to claim 5, wherein at least a part of the aluminum has a bent structure.

7. The cellulose fiber-dispersing resin composite material according to claim 5, wherein when the cellulose fiber-dispersing resin composite material is thermally fused to an aluminum foil, the cellulose fiber-dispersing resin composite material exhibits a peel strength of 1.0 N/10 mm or more between the aluminum foil.

8. The cellulose fiber-dispersing resin composite material according to claim 1, comprising at least one of a metal salt of organic acid, organic acid, and silicone.

9. The cellulose fiber-dispersing resin composite material according to claim 1, wherein the resin further comprises resin particles made of a resin different from the resin and are dispersed in the resin.

10. The cellulose fiber-dispersing resin composite material according to claim 1, wherein at least a part of the resin and/or at least a part of the cellulose fiber is derived from a recycled material.

11. A formed body, which is obtained by using the cellulose fiber-dispersing resin composite material according to claim 1.

12. The formed body according to claim 11, which is a tubular body or is a divided body formed by dividing a tubular body.

13. A composite member, which is obtained by combining the formed body according to claim 11, and another material.

14. The cellulose fiber-dispersing resin composite material according to claim 1, which is joined to a metal to form a composite.

* * * * *